United States Patent [19]

Winkler et al.

[11] Patent Number: 4,822,008
[45] Date of Patent: Apr. 18, 1989

[54] VIBRATION-DAMPED SPRING

[75] Inventors: Otmar Winkler, Schweinfurt; Manfred Brandenstein, Eussenheim; Rudiger Hans, Niederwerrn, all of Fed. Rep. of Germany

[73] Assignee: SFK GmbH, Fed. Rep. of Germany

[21] Appl. No.: 128,728

[22] Filed: Dec. 4, 1987

[30] Foreign Application Priority Data

Dec. 10, 1986 [DE] Fed. Rep. of Germany ... 8633068[U]

[51] Int. Cl.⁴ .......................... F16F 13/00; F16F 1/06
[52] U.S. Cl. ...................................... 267/74; 267/174; 267/180
[58] Field of Search ............... 267/151, 166, 167, 170, 267/171, 174, 180, 221, 223, 73, 74

[56] References Cited

U.S. PATENT DOCUMENTS

| 231,150 | 8/1880 | Cliff | 267/180 X |
| 1,210,518 | 1/1917 | Nolan | 267/171 X |
| 1,260,921 | 3/1918 | Leissner | 267/174 X |
| 2,054,009 | 9/1936 | Thrush | 267/180 X |
| 2,622,448 | 12/1952 | Lorig | 267/180 X |
| 3,582,059 | 6/1971 | Van Ooy | 267/180 X |

Primary Examiner—Duane A. Reger
Attorney, Agent, or Firm—Eugene E. Renz, Jr.

[57] ABSTRACT

Vibration-damped spring for dynamic tension rollers, consisting of a tubular vibration damper with freedom of linear movement and a helical spring closely surrounding the damper wherein the helical spring has a middle section with turns of a larger diameter and in that, starting from that section, a continuous transition is provided toward the two ends with turns of a smaller diameter.

1 Claim, 1 Drawing Sheet

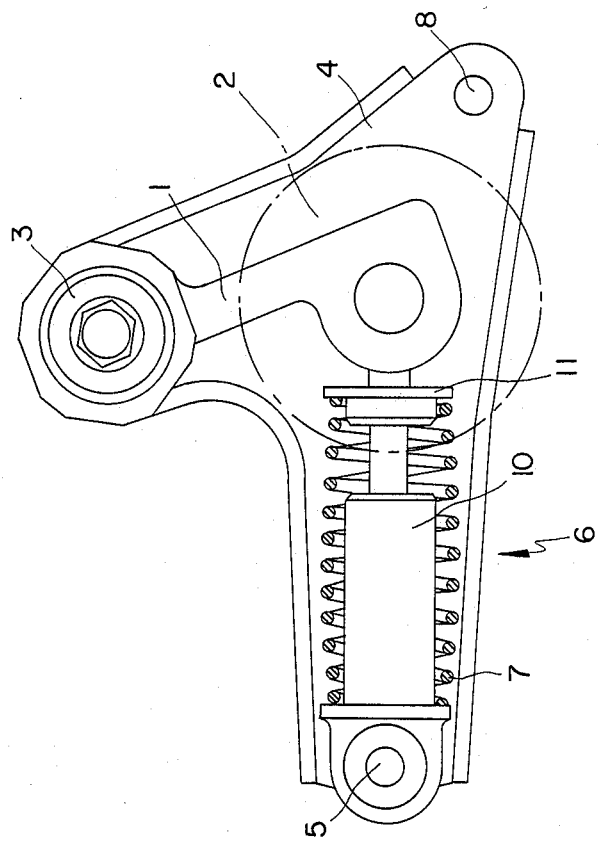

VIBRATION-DAMPED SPRING

FIELD OF THE INVENTION

The present invention relates to improvements in vibration-damped springs particularly adapted for dynamic tension rollers.

BACKGROUND OF THE INVENTION

Springs of this general type are not new per se. West German Utility Pat. No. 77-03,393 shows a typical prior art type of design. In accordance with the design shown in this West German Utility Model Pat., a tubular vibration damper is provided with a piston rod which moves in a linear manner inside it. A helical spring is mounted coaxially on the tube with a small amount of radial clearance. The spring is braced at one end against the stop on the tube and at the other end against a stop on the piston rod. In the tension state, nearly all of the turns of the helical spring are on the tube. The spring is generally cylindrical since all of the turns have the same diameter. It has been found that the individual turns, particularly in the middle section of the spring move out of axial alignment when the spring is tensioned and touch the tube of the vibration damper. This is attributable to unavoidable tolerances during mass production of these springs and diameter variations or structural differences in the starting raw material for making the springs. Due to the linear strokes which occur at various vibration frequencies during operation, there is constant frictional contact between the spring and the tube which generates noise and causes wear. One solution to this problem would be to increase the diameter of the turns and thus create more space between the vibration damper and the spring. However, tension rollers are usually installed together with other assemblies of the belt drive in automobile vehicles in the space between the engine and radiator. It is noted that this space is already quite cramped and that in general in this region a pre-established structural volume is critical and cannot be exceeded.

SUMMARY OF THE INVENTION

To this end, the present invention provides a vibration-damped spring particularly adapted for the applications discussed above wherein the frictional contact between the helical spring and the tube of the vibration damper is eliminated under all operating conditions.

This is achieved in accordance with the present invention by a helical spring configuration having a central section with turns of larger diameter than the turns adjacent the opposite terminal free ends. Further, the spring design is such that starting from the middle section and progressing toward opposing free ends of the spring, there is a continuous transition with turns of progressively smaller diameter.

In the central section of the helical spring, at least one turn has a diameter larger than all of the others in the preferred embodiment of the present invention. The continuous decrease in diameter toward the free ends has the effect that each successive turn having a slightly smaller diameter is centered by the preceding larger one. Accordingly, when the axial distance between the adjacent turns is small, particularly in the tension state, each turn is opposed by a relatively high radial spring force component of the adjacent turn of larger diameter. Thus each turn has a stable radial position which is not the case for a purely cylindrical helical spring of the prior art patent discussed above. By the spring configuration of the present invention, contact with a tube of the vibration damper is advantageously eliminated. Even though the central section of a helical spring according to the present invention has a somewhat larger diameter, the additional space required for this is far smaller than that for a cylindrical helical spring with a diameter large enough overall to prevent contact between it and the tube reliably. To achieve this, a much larger diameter would have to be provided since the turns in the tension state are fundamentally very unstable with respect to their radial position.

In accordance with the present invention, the helical spring has a longitudinal profile which is either essentially elliptical or in the shape of a double cone. Thus, the turns of larger diameter are located in the central section. A spring of this type is easy and economical to produce since the middle turns are only slightly larger than those at the ends of the helical spring. Thus, an appropriately shaped winding core is utilized, even the larger diameter of which can be easily pulled out of the finished spring because all the turns expand radially outward after the winding force has been released.

In the preferred configuration of helical spring in accordance with the present invention, the turns of the central section preferably have a diameter which is 5–10% greater than the diameter of the turns at the free terminal ends of the spring. It has been found that this arrangement provides optimum operating conditions and facilitates ease of manufacture.

BRIEF DESCRIPTION OF THE DRAWINGS

These and other objects of the present invention and the various features and details of the operation and construction thereof are hereinafter more fully set forth with reference to the accompanying drawing, wherein:

FIG. 1 shows a partial top plan view of a tension device with a linear damping element and helical spring in accordance with the present invention.

DETAILED DESCRIPTION OF THE PREFERRED EMBODIMENT

Referring now to the drawing, there is shown a tensioning device which comprises a support element 1 and a tension roller 2 which is free to rotate and which, for sake of clarity, has not been shown in its full size in all its details. Support element 1 has a pivot bearing 3 a predetermined distance away from tension roller 2 which is attached to a mounting plate 4. A linear action vibration damper 6 is disposed between the attachment point of tension roller 2 and a joint pin 5 of mounting plate 4. The vibration damper 6 has a helical spring mounted coaxially therein and these parts lie approximately on a tangent to the pivot circle of tension roller 2 around pivot bearing 3. As illustrated, helical spring 7 is designed as a compression spring and moves tension roller 2 and support element 1 around pivot bearing 3 in one of the pivot directions. A drive belt (not shown) is tensioned by helical spring 7 and tension roller 2. Vibration damper 6, thus, has a damping effect on the pivoting motion of tension roller 2. Mounting plate 4 can be secured, for example, to a machine block by means of screws which pass through a mounting hole 8 and through pivot bearing 3.

As illustrated in the longitudinal section, the profile of the turns of the helical spring 7 describes the form of a partial ellipse wherein the turns in the central section 7a are farther away from the vibration damper 6 than the turns at the outer free terminal ends 7b. The turns at the ends 7b and 7c are fitted to the diameter of tube 10 and 11 on the piston rod respectively in the manner shown.

In accordance with the present invention, at least one turn, preferably the turn at the central section 7a of the helical spring 7, has a greater diameter D than the diameter of the turns extending therefrom toward the terminal free ends of the spring. Note that the turns as they move away from the central section are of a slightly smaller diameter so that, as noted previously, the successive turns are centered by a preceding turn. Thus, when the spring is tensioned, the axial distance between adjacent turns is small and each turn is opposed by a relatively high radial spring force component of the adjacent turn of large diameter. In this manner, each turn has a stable radial position and consequently, contact of the tube with the vibration damper is advantageously eliminated. In accordance with the preferred embodiment of the invention, the diameter D of the turns at the central section 7a are preferably in the range of 5-10% greater than the diameter $D_e$ of the turns at the terminal ends of the spring 7b and 7c. This, as noted previously, provides optimum operating conditions and facilitates manufacture.

What is claimed is:

1. Dynamic tension assembly comprising a support element (1), including a pivot bearing (3), a tension roller (2), a linear action vibration damper (6) adapted to provide a damping effect upon pivoting motion of tension roller (2) relative to a pivot bearing (3), a helical spring (7) closely surrounding said vibration damper (6) and having a middle section with turns of a larger diameter (D), and starting from the middle section, a continuous transition is provided toward the two ends with turns of a smaller diameter ($D_e$), the diameter D at the middle section being about between 5-10% greater than the diameter ($D_e$) at the terminal ends so that when the spring is tensioned, the axial distance between adjacent turns is small and each turn is opposed by a relatively high radial spring force component whereby each turn has a stable radial position and contact of spring with tubular member is avoided.

* * * * *